US010626548B2

(12) United States Patent
Nishimura et al.

(10) Patent No.: US 10,626,548 B2
(45) Date of Patent: Apr. 21, 2020

(54) BASE BODY FOR ARTIFICIAL LEATHER

(71) Applicant: Toray Industries, Inc., Tokyo (JP)

(72) Inventors: Hajime Nishimura, Otsu (JP);
Yukihiro Matsuzaki, Godo (JP);
Makato Nishimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 379 days.

(21) Appl. No.: 14/424,323

(22) PCT Filed: Aug. 29, 2013

(86) PCT No.: PCT/JP2013/073146
§ 371 (c)(1),
(2) Date: Feb. 26, 2015

(87) PCT Pub. No.: WO2014/034780
PCT Pub. Date: Mar. 6, 2014

(65) Prior Publication Data
US 2015/0252524 A1 Sep. 10, 2015

(30) Foreign Application Priority Data
Aug. 31, 2012 (JP) ................ 2012-192605

(51) Int. Cl.
*D06N 3/00* (2006.01)
*C08G 63/16* (2006.01)
*D04H 1/4382* (2012.01)
*D04H 1/435* (2012.01)
*D04H 1/46* (2012.01)
*D01F 6/84* (2006.01)
*D01F 8/14* (2006.01)

(52) U.S. Cl.
CPC ........... *D06N 3/0004* (2013.01); *C08G 63/16* (2013.01); *D01F 6/84* (2013.01); *D01F 8/14* (2013.01); *D04H 1/435* (2013.01); *D04H 1/4382* (2013.01); *D04H 1/46* (2013.01); *D06N 3/0011* (2013.01); *D06N 3/0036* (2013.01); *D06N 2201/0209* (2013.01); *D06N 2209/0861* (2013.01); *D06N 2209/10* (2013.01); *D06N 2209/105* (2013.01); *D06N 2209/1635* (2013.01); *D06N 2211/28* (2013.01); *D10B 2331/04* (2013.01); *Y10T 428/268* (2015.01)

(58) Field of Classification Search
CPC .. C08G 63/16; D01F 8/14; D01F 6/84; D04H 1/46; D04H 1/435; D04H 1/4382; D06N 3/0004; D06N 3/0011; D06N 3/0036; D06N 2209/0861; D06N 2209/10
See application file for complete search history.

(56) References Cited

U.S. PATENT DOCUMENTS

| | | | | |
|---|---|---|---|---|
| 3,846,844 A | * | 11/1974 | Graf | .......................... A41D 5/00 2/93 |
| 4,145,518 A | | 3/1979 | Morie et al. | |
| 4,181,640 A | | 1/1980 | Morie et al. | |
| 4,188,960 A | | 2/1980 | Morie et al. | |
| 4,882,220 A | * | 11/1989 | Ono | ..................... D06M 13/005 442/96 |
| 2002/0081418 A1 | * | 6/2002 | Iijima | .................. D06N 3/0075 428/151 |
| 2002/0114919 A1 | * | 8/2002 | Yoneda | ..................... D06N 3/00 442/340 |
| 2003/0037381 A1 | * | 2/2003 | Hashimoto | ........... D06N 3/0004 8/115.51 |
| 2004/0241346 A1 | | 12/2004 | Hanaoka et al. | |
| 2005/0227902 A1 | * | 10/2005 | Erazo-Majewicz | ....... A61K 8/73 510/470 |
| 2007/0111620 A1 | * | 5/2007 | Ono | .......................... B32B 7/12 442/104 |
| 2008/0173387 A1 | | 7/2008 | Hanaoka et al. | |
| 2009/0124829 A1 | | 5/2009 | Gong | |
| 2012/0322970 A1 | * | 12/2012 | Peters | ...................... C07C 67/08 528/308.1 |
| 2014/0058059 A1 | * | 2/2014 | Okubo | ................. C08G 63/672 528/295 |

FOREIGN PATENT DOCUMENTS

| | | | |
|---|---|---|---|
| CA | 2834247 A1 * | 3/2013 | ............. C07C 29/80 |
| CN | 101046007 | 10/2007 | |
| CN | 101050270 | 10/2007 | |
| JP | 62-6006 | 2/1987 | |
| JP | 2009-91694 A | 4/2009 | |
| JP | 2009-209145 A | 9/2009 | |
| JP | 2009-209145 A5 | 4/2012 | |
| KR | 10-0758583 B1 | 9/2007 | |
| WO | 2003/027380 | 4/2003 | |
| WO | 2009/064515 | 5/2009 | |
| WO | 2013/035559 | 3/2013 | |

OTHER PUBLICATIONS

Supplementary European Search Report dated Mar. 18, 2016 of corresponding European Application No. 13832277.1.
Notification of Reason for Refusal dated Jun. 19, 2019, of counterpart Korean Applicatin No. 10-2015-7004076, along with an English translation.

* cited by examiner

Primary Examiner — Jeremy R Pierce
(74) Attorney, Agent, or Firm — DLA Piper LLP (US)

(57) ABSTRACT

A base body for an artificial leather includes an intertwined fiber body mainly including an ultrafine fiber having a 0.01 to 10 μm fiber diameter and an elastic polymer, the ultrafine fiber including, as a constituent polymer, a polyester obtained from a dicarboxylic acid and/or an ester-forming derivative thereof, and a diol, the polyester containing 15 to 500 ppm of a 1,2-propanediol-derived component.

6 Claims, No Drawings

BASE BODY FOR ARTIFICIAL LEATHER

TECHNICAL FIELD

This disclosure relates to base bodies for application in artificial leather.

BACKGROUND

Since polyester has excellent mechanical strength, chemical stability and transparency, as well as being inexpensive, it is one of the synthetic resins most commonly used as a fibrous material throughout the world. Of all kinds of polyester, polyethylene terephthalate (PET) is particularly advantageously used because of its excellence in general versatility and practical applicability.

Generally speaking, polyethylene terephthalate is manufactured from terephthalic acid or an ester-forming derivative thereof, and ethylene glycol. Such raw materials are normally obtained from fossil resources. Although oil, a fossil resource, is an important raw material in the chemical industry, it is a cause of global warming and other environmental problems as it generates large quantities of carbon dioxide during manufacturing and incineration disposal, not to mention concerns over future depletion. Such being the case, much attention has been focused on reclaimed materials and materials with a low environmental load.

Biomass resources are produced by plants from water and carbon dioxide through photosynthesis, and take the forms of starch, carbohydrate, cellulose, lignin, and the like. Since biomass resources take in carbon dioxide as one of their input materials during their formation processes, any material that uses a biomass resource does not produce any net carbon dioxide emissions in its life cycle, even if it is decomposed into carbon dioxide and water during post-use incineration disposal. As this carbon dioxide may, under certain circumstances, be recycled by plants, biomass resources can be regarded as renewable resources. Accordingly, using such biomass resources as an alternative to oil resources helps preserve fossil resources and reduce carbon dioxide emissions.

Against this background, ways to synthesize polyester, a very high-demand polymer in the world, from renewable biomass resources are being studied. Examples include a report on PET synthesized from biomass-derived ethylene glycol (Chinese Patent Publication No. 101046007). However, since biomass-derived ethylene glycol is low in purity, any polymer obtained from it exhibits a problem of thermostability in the form of a low melting point.

As a method to overcome this problem, an adsorption treatment designed to remove impurities from biomass-derived glycol using activated carbon has been disclosed (Japanese Unexamined Patent Publication (Kokai) No. 2009-209145). That method has made it possible to obtain polymers with melting points comparable to those synthesized from fossil resource-based glycols.

Compared to fossil resource-based polymers, polymers synthesized from biomass-derived glycol still have poor thermostability. Usually, polyester chips are subjected to the processes of remelting and molding into a filament, a film, and a resin. In this commonly performed processes, exposure of polymers synthesized from biomass-derived glycol to a temperature approaching 300° C. promotes their decomposition reaction, resulting in yellowing, a reduction in viscosity, and a reduction in molecular weight, leading to undesirable phenomena in use, including an increased soiling of the die of the molding machine, generation of foreign matter, and a reduction in physical properties of a resin molded article. In particular, an artificial leather comprising an ultrafine fiber, and the like are remarkably affected.

Accordingly, the development of a polyester having excellent thermostability during melt molding and imparting favorable physical properties to an application product, namely a polyester ultrafine fiber which exhibits only a small reduction in intrinsic viscosity during melt molding and can impart excellent abrasion characteristics to the product, as well as a base body for an artificial leather using the polyester ultrafine fiber has been desired.

It could therefore be helpful to provide a base body for an artificial leather comprising a polyester excellent in thermostability during melt molding. That is, it could be helpful to provide an ultrafine fiber comprising a polyester which exhibits only a small reduction in intrinsic viscosity during melt molding and can impart excellent abrasion characteristics to the product, as well as a base body for an artificial leather using the ultrafine fiber.

SUMMARY

We discovered that thermostability of polyester during melt molding improved as the purity of biomass-derived glycol increased and further discovered that 1,2-propanediol, an impurity present in biomass-derived glycol, provided the polyester with better thermostability during melt molding than a polymer obtained from fossil resource-based glycol—i.e. successfully limiting the reduction in its intrinsic viscosity during melt molding—when kept in a certain amount range rather than merely removed as an impurity. More specifically, we discovered that a polyester characteristically containing 15 to 500 ppm of a 1,2-propanediol-derived component excelled in thermostability during melt molding, namely exhibiting only a small reduction in intrinsic viscosity during melt molding, and excelled as an abrasion resistance imparting material for ultrafine fibers of a base body for an artificial leather and the like.

We also discovered that in particular a copolymer obtained by copolymerizing with polyethylene glycol, and a 5-sulfoisophthalic acid salt and/or an ester-forming derivative thereof is remarkably advantageous in the above-described effects.

We thus provide:

(1) A base body for an artificial leather comprising an intertwined fiber body mainly comprising an ultrafine fiber having a 0.01 to 10 μm fiber diameter and an elastic polymer as constituent components, the ultrafine fiber comprising polyester as a constituent component, the polyester comprising a dicarboxylic acid and/or an ester-forming derivative thereof, and a diol as copolymerization components, the polyester containing 15 to 500 ppm of a 1,2-propanediol-derived component.

(2) The base body for an artificial leather according to the above (1), wherein the 1,2-propanediol-derived component is present in an amount of 45 to 400 ppm in the polyester.

(3) The base body for an artificial leather according to the above (1) or (2), wherein a 5-sulfoisophthalic acid salt and/or an ester-forming derivative thereof are contained as the copolymerization components.

Although the mechanism of this improvement in thermostability is not yet fully understood, it may be explained as follows. Generally speaking, diols have the capacity to cyclize and become a bidentate ligand in relation to a metal such as a condensation polymerization catalyst. 1,2-propanediol may be considered to be a compound having a methyl group as a side chain bound to ethylene glycol at one of the two carbon atoms present in. Generally speaking, the greater the number of substituent groups as a side chain of a chain molecule is or the bulkier such substituent groups are, the more likely the chain molecule cyclizes due to a stereoscopic overhang effect. For this reason, despite both being diols, 1,2-propanediol is more likely to cyclize and become a bidentate ligand in relation to a metal than ethylene glycol as it has a methyl group as a side chain. Along these lines, a minute amount of 1,2-propanediol contained in polyester is thought to preferentially have become a bidentate ligand in relation to a metal serving as a polymerization catalyst. This, in turn, is thought to improve thermostability during melt molding by limiting the thermal decomposition reaction involving a metal catalyst without suppressing its polymerization activity.

Since the ultrafine fibers of the base body for an artificial leather mainly comprise a biomass plastic, the base body is an environment-conscious material. In addition, since the fibers exhibit only a small reduction in intrinsic viscosity during melt molding, the base body for an artificial leather has excellent abrasion resistance. Furthermore, the polyester used as a constituent component of the ultrafine fiber has excellent thermostability during melt molding, namely exhibits only a small reduction in intrinsic viscosity during melt molding. Accordingly, the soiling of the die of the molding machine and generation of foreign matter are limited, and this makes continuous operation possible, thus increasing production efficiency.

DETAILED DESCRIPTION

The polyester forming the ultrafine fiber of the base body for an artificial leather can be obtained by reaction of a dicarboxylic acid and/or an ester-forming derivative thereof (hereinafter also referred to as the "dicarboxylic acid component") with a diol and contains a 1,2-propanediol-derived component in the range of 15 to 500 ppm, more preferably 45 to 400 ppm. If the obtained polyester contains a 1,2-propanediol-derived component in an amount over this range, the thermostability deteriorates, while, if it contains a 1,2-propanediol-derived component in an amount below this range, a thermostability improvement effect cannot be obtained.

"1,2-propanediol-derived component" represents every component detected as 1,2-propanediol when polyester is decomposed and analyzed, for example, 1,2-propanediol in a copolymerized form in the polymer chain and 1,2-propanediol interposed among the polymer chains. That is, 1,2-propanediol may be partially copolymerized into the backbone chain of the polyester or contained as a monomer without being copolymerized.

Examples of the dicarboxylic acid and/or an ester-forming derivative thereof include terephthalic acid, isophthalic acid, a naphthalene dicarboxylic acid (e.g. 2,6-naphthalene dicarboxylic acid), a diphenyl dicarboxylic acid (e.g. diphenyl-4,4-dicarboxylic acid), aliphatic carboxylic acids such as oxalic acid, malonic acid, succinic acid, glutaric acid, adipic acid, pimelic acid, suberic acid, azelaic acid, sebacic acid, undecanedioic acid, and dodecanedioic acid, alicyclic dicarboxylic acids such as a cyclohexanedicarboxylic acid, aromatic dicarboxylic acids such as 1,4-cyclohexanedicarboxylic acid and a 5-sulfoisophthalic acid salt (e.g. lithium 5-sulfoisophthalate, potassium 5-sulfoisophthalate and sodium 5-sulfoisophthalate), and any ester-forming derivative thereof "Ester-forming derivatives" represent lower alkyl esters, anhydrides, acyl chlorides, and other derivatives of such dicarboxylic acids, and among them, for example, methyl esters, ethyl esters, hydroxyethyl esters, and the like are preferably used. More preferable forms of the dicarboxylic acid and/or an ester-forming derivative thereof are terephthalic acid and/or a dimethyl ester thereof.

Terephthalic acid and/or a dimethyl ester thereof may be biomass-derived. As there are no specific restrictions on the method to obtain biomass-derived terephthalic acid, any method may be used. Examples include a processing sequence comprising the synthesis of p-cymene from cineole obtained from plants of the genus *Eucalyptus* (see Bulletin of Chemical Society of Japan, (2), pp. 217-219; 1986), followed by the production of terephthalic acid via p-methyl benzoic acid (see Organic Syntheses, 27; 1947). There is yet another method in which terephthalic acid is obtained from furan dicarboxylic acid and ethylene via a Diels-Alder reaction (see WO2009-064515). The biomass-derived terephthalic acid obtained in this manner may be further converted into an ester-forming derivative.

Examples of the diol include diol components such as ethylene glycol, 1,3-propanediol, 1,4-butanediol, 1,5-pentanediol, 1,6-hexanediol, cyclohexanedimethanol, diethylene glycol, 2-methyl-1,3-propanediol, a polyoxyalkylene glycol with a molecular weight of 500 to 20,000 (e.g. polyethylene glycol), and bisphenol A-ethylene oxide adduct, and among them, ethylene glycol is preferable. Since biomass-derived ethylene glycol often contains 1,2-propanediol, it is more preferable that biomass-derived ethylene glycol be used after adjusting its 1,2-propanediol content through purification.

There are no specific restrictions on the method to obtain biomass-derived ethylene glycol, and examples include a method that uses corn, sugarcane, wheat, stems of crops, or some other biomass resource. Such biomass resources are first converted into starch, which, in turn, is converted into glucose using water and an enzyme, and glucose is then converted into sorbitol via a hydrogenation reaction. In turn, sorbitol undergoes a hydrogenation reaction at a constant temperature and pressure in the presence of a catalyst to become a mixture of various glycols, followed by purification to obtain ethylene glycol.

The ratio of biomass-derived carbon is also referred as to "biobased content". When biomass-derived raw materials are used, the biobased content of the resulting polyester can be determined by measuring the concentration of $^{14}C$ (pMC).

The concentration of the radioactive carbon $^{14}C$ can be measured in accordance with a radiocarbon concentration measurement method as described below. The radiocarbon concentration measurement method uses an accelerator mass spectrometer (AMS) to separate the atoms of carbon isotopes ($^{12}C$, $^{13}C$, and $^{14}C$) contained in the analysis specimen using the weight difference and measure the abundance of those isotope atoms. Most carbon atoms are $^{12}C$, but its stable $^{13}C$ is also present at an abundance of about 1.1%. The carbon $^{14}C$ is a radioactive isotope with a half-life of about 5370 years, and its abundance has been steadily decreasing due to radioactive decay. It takes another 226,000 years for it to totally decay. The Earth's upper atmosphere is constantly bombarded by cosmic rays, and minute quantities of $^{14}C$ are continuously produced. This $^{14}C$ replenishment balances out radioactive decay, and keeps the atmospheric concentration of $^{14}C$ roughly constant (approx. 1 part per trillion of all carbon atoms). Such $^{14}C$ immediately undergoes an isotopic exchange reaction with the carbon dioxide $^{12}C$, and carbon dioxide containing $^{14}C$ is generated in the process. Since plants grow by taking in atmospheric carbon dioxide and engaging in photosynthesis, they always contain $^{14}C$ at a certain concentration. In contrast, oil, coal, and natural gas, as fossil resources, contain hardly any $^{14}C$ as their shares of $^{14}C$, which were initially present, have over the eons virtually completely decayed. This makes it possible to determine the content of biomass-derived carbon and that of fossil resource-based carbon by measuring the concentration of $^{14}C$. At present, it is common to use a standard that sets at 100% the concentration of $^{14}C$ in the natural carbon cycle in the 1950s, with oxalic acid designated as the standard substance (supplied by National Institute of Standards and Technology, NIST). Under this standard, a quantity expressed in pMC (percent Modern Carbon) is calculated in accordance with the following formula:

$$pMC = (^{14}Csa/^{14}C50) \times 100$$

$^{14}C50$: the $^{14}C$ concentration of the standard substance (representing the concentration of $^{14}C$ in the natural carbon cycle in the 1950s)
$^{14}Csa$: the $^{14}C$ concentration of the measurement specimen The atmospheric concentration of $^{14}C$ as of 2011 based on the above measurement method is known to be 105 pMC (percent Modern Carbon), so that any 100% biomass-derived material is expected to more or less register the same pMC value of 105. In contrast, the $^{14}C$ concentration of fossil resources is always 0 pMC and, based on this fact, the biobased content of a given material can be calculated by allocating a biobased content of 100% to 105 pMC and a biobased content of 0% to 0 pMC. That is, the measured $^{14}C$ concentration value X (pMC) is converted into the corresponding biobased content value Y (%) in accordance with the following formula:

$$105:100 = X:Y$$

It is preferable that the biobased content of the resulting polyester be 10% or more, and for reduction in environmental load, more preferably 15% or more.

It is preferable that the polyester used to produce the base body for an artificial leather be polyethylene terephthalate obtained from terephthalic acid and/or a dimethyl ester thereof as the component comprising a dicarboxylic acid and/or an ester-forming derivative (hereinafter may be abbreviated as the "dicarboxylic acid component"), on the one hand, and ethylene glycol as the diol component, on the other. Furthermore, a polyester copolymer mainly comprising ethylene terephthalate units exhibits a remarkable improvement in thermostability.

Examples of the diol component include 1,3-propanediol, 1,4-butanediol, 1,5-pentanediol, 1,6-hexanediol, a polyoxyalkylene glycol with a molecular weight of 500 to 20,000 (e.g. polyethylene glycol), diethylene glycol, 2-methyl-1,3-propanediol, and bisphenol A-ethylene oxide adduct.

A copolymerization component of the polyester used to produce the base body for an artificial leather may contain structural units derived from the components described below. Examples include structural units derived from aliphatic carboxylic acids such as oxalic acid, malonic acid, succinic acid, glutaric acid, pimelic acid, suberic acid, azelaic acid, sebacic acid, undecanedioic acid, and dodecanedioic acid; alicyclic dicarboxylic acids such as a cyclohexanedicarboxylic acid; and aromatic dicarboxylic acids such as terephthalic acid, isophthalic acid, a naphthalene dicarboxylic acid, a diphenyl dicarboxylic acid, 1,4-cyclohexane dicarboxylic acid, isophthalic acid, and a 5-sulfoisophthalic acid salt (e.g. lithium 5-sulfoisophthalate, potassium 5-sulfoisophthalate, and sodium 5-sulfoisophthalate).

Among them, 5-sulfoisophthalic acid salts such as lithium 5-sulfoisophthalate, potassium 5-sulfoisophthalate, and sodium 5-sulfoisophthalate, ester-forming derivatives thereof, and polyoxyalkylene glycols with a molecular weight of 500 to 20,000 are more preferable. A preferred form of the polyoxyalkylene glycol is polyethylene glycol, and a polyethylene glycol with a molecular weight of 500 to 10,000 is particularly preferable.

It is preferable that, as a copolymerization component, 5-sulfoisophthalic acid salts be contained in an amount of 0.1 to 10 mol % in relation to the total dicarboxylic acid components as the ingredient of the polyester. It is also preferable that, as a copolymerization component, a polyoxyalkylene glycol with a molecular weight of 500 to 30,000 be contained in amount of 0.1 to 10.0% by weight in relation to the weight of the resulting polyester.

Such copolymerization components may be used singly but it is preferable that two or more be used in combination as they lead to more pronounced thermostability improvement.

A polyester containing the above-described copolymerization components is preferably used, for example, as a sea component (soluble component) of an islands-in-the-sea conjugated fiber. As with an island component forming ultrafine fibers, a polyester containing a 1,2-propanediol-derived component as a copolymerization component is more preferably used because the polyester is less likely to crystallize due to the 1,2-propanediol-derived component present therein and thus more soluble than ordinary polyesters.

It is important that the ultrafine fiber used in the base body for an artificial leather has an average single fiber diameter of 0.01 to 10 μm. When the average single fiber diameter is up to 10 μm, and preferably up to 5 μm, the resulting artificial leather, for example, a suede-like artificial leather will enjoy good texture. In contrast, high fiber strength and rigidity will be retained when the average single fiber diameter is at least 0.01 μm, and preferably at least 0.5 μm.

The polyester polymers used as a constituent of the polyester ultrafine fiber may contain additives such as particles, flame retardants, and antistatic agents.

As the intertwined fiber body, woven, knitted, nonwoven, and other fabrics may be used and, in particular, the use of a nonwoven fabric prepared by intertwining a tow of ultrafine fibers (ultrafine fiber tow) is preferable in view of the surface uniformity and the sheet strength.

The form of the ultrafine fiber tow may be the one in which the ultrafine fibers are mutually distanced from each other to some degree, the one which the ultrafine fibers are partly bonded, or the one which the ultrafine fibers are partly aggregated.

Examples of the nonwoven fabric used for the base body for an artificial leather include short fiber nonwoven fabrics prepared by forming a laminated web by curding or by the use of a cross wrapper, and subjecting the laminated web to needle punching, water jet punching, or the like; long fiber nonwoven fabrics obtained by spun bonding, melt blowing, or the like; and nonwoven fabrics obtained by a paper making method. Among them, a short fiber nonwoven fabric and a spun bond nonwoven fabric are preferably used because of the ease of producing the fabric having a highly uniform thickness.

The nonwoven fabric may be backed by or laminated with a woven or knitted fabric for the purpose of improving the strength and the like. When the nonwoven fabric and the woven or knitted fabric are integrated by lamination and needle punching of the fabrics, a hard twist yarn is preferably used for the thread of the woven or knitted fabric to prevent damages done to the fibers constituting the woven or knitted fabric by the needle punching. The twist number of the thread is preferably in the range of 500 T/m to 4500 T/m, and the fiber diameter of the woven or knitted fabric may be the same as or less than the fiber diameter of the ultrafine fiber nonwoven fabric.

It is important that, in the base body for an artificial leather, the intertwined fiber body such as the above nonwoven fabric contains an elastic polymer. The elastic polymer has a binder effect which prevents falling of the ultrafine fiber off the base body for an artificial leather, and also imparts an adequate cushioning property to the nonwoven fabric.

Examples of the elastic polymer include polyurethane, polyurea, polyurethane-polyurea elastomer, polyacrylic acid, acrylonitrile-butadiene elastomer, and styrene-butadiene elastomer. Polyurethane is preferably used because of its softness and cushioning property.

Examples of the polyurethane include a polyurethane and a modified polyurethane produced by reacting at least one polymer diol having an average molecular weight of 500 to 3000 selected from polyester diols, polyether diols, polycarbonate diols, and polyester polyether diols, at least one diisocyanate selected from aromatic diisocyanates such as 4,4'-diphenylmethanediisocyanate, alicyclic diisocyanates such as isophorone diisocyanate, and aliphatic diisocyanates such as hexamethylene diisocyanate, and at least one low molecular weight compound having at least 2 active hydrogen atoms such as ethylene glycol, butanediol, ethylenediamine, and 4,4'-diaminodiphenylmethane at a predetermined molar ratio.

The elastic polymer may also contain an elastomer resin such as polyester, polyamide, polyolefin, or other elastomer resins, an acrylic resin, an ethylene-vinyl acetate resin, or the like.

If desired, the elastic polymer may also contain an additive. Examples of the additive include a pigment such as carbon black, a dye antioxidant, an antioxidant, a lightproofing agent, an antistatic agent, a dispersant, a softening agent, an anticoagulant, a flame retardant, an antimicrobial agent, and a deodorizer.

The elastic polymer may be either in the form of a solution in an organic solvent or a dispersion in water.

The content of the elastic polymer is preferably 5 to 100% by mass in relation to the intertwined fiber body comprising the intertwined ultrafine fiber tows. The surface condition, cushioning property, hardness, strength, and the like of the base body for an artificial leather can be adjusted by changing the elastic polymer content. Falling of the fiber off the base body can be reduced by adjusting the content rate of the elastic polymer to at least 5% by mass, more preferably at least 20% by mass, and still more preferably at least 30% by mass. In contrast, the ultrafine fiber will be consistently dispersed on the surface when the content rate of the elastic polymer is up to 100% by mass, more preferably up to 80% by mass, and still more preferably up to 60% by mass.

The weight per unit area of the base body for an artificial leather is preferably 100 to 500 g/m². When the weight per unit area of the base body for an artificial leather is at least 100 g/m², and more preferably at least 150 g/m², the base body for an artificial leather will have sufficient shape and size stabilities. In contrast, when the weight per unit area is up to 500 g/m², and more preferably up to 300 g/m², the base body for an artificial leather will have a sufficient softness.

The thickness of the base body for an artificial leather is preferably 0.1 to 10 mm. Sufficient shape and size stabilities are achieved by adjusting the thickness to at least 0.1 mm, and preferably at least 0.3 mm. In contrast, sufficient softness is achieved by limiting the thickness to up to 10 mm, and more preferably up to 5 mm.

Preferably, one surface of the base body for an artificial leather is subjected to a napping treatment, and such treatment provides dense texture with the product when the base body is used in producing a suede-like artificial leather.

Next, the method of producing the base body for an artificial leather, and the method of producing a polyester fiber constituting the base body are described.

The method of producing the polyester preferably comprises the following:

(A) first obtaining low polymers from terephthalic acid and an alkylene glycol through a direct esterification reaction, and then obtaining a high-molecular weight polymer through their condensation polymerization reaction or (B) first obtaining low polymers from dimethyl terephthalate and an alkylene glycol through an ester interchange reaction, and then obtaining a high-molecular weight polymer through their condensation polymerization reaction.

It is preferable that a phosphorus compound be added to the polyester used as a stabilizer. Specific examples of the phosphorus compound include phosphoric acid, trimethyl phosphate, and ethyl diethylphosphonoacetate. More preferable in terms of color tone and improved thermostability are trivalent phosphorus compounds such as 3,9-bis(2,6-di-t-butyl-4-methylphenoxy)-2,4,8,10-tetraoxa-3,9-diphosphaspiro[5,5]undecane (PEP-36, manufactured by ADEKA CORPORATION), as expressed with Chemical formula (1) below, and tetrakis(2,4-di-t-butyl-5-methylphenyl) [1,1-biphenyl]-4,4'-diylbisphosphonite (GSY-P101, manufactured by Osaki Industry Co., Ltd.), as expressed with Chemical formula (2) below. There are no specific restrictions on the amount of the phosphorus compound added, and the amount is preferably 10 to 500 ppm with respect to the polymer on a phosphorus atom basis.

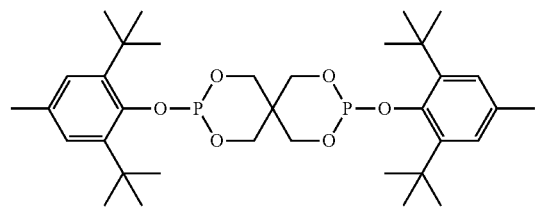

(1)

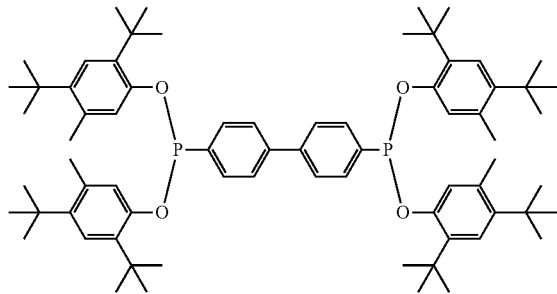

(2)

If needed, dyes used as color tone adjusting agents for resins and the like may also be added to the polyester. Specific examples in terms of a color index generic name include Solvent Blue 104 and Solvent Blue 45, as blue-based color tone adjusting agents, and Solvent Violet 36, as a purple-based color tone adjusting agent—which are preferable as they exhibit relatively good thermostability at high temperatures and an excellent chromogenic property, while being free of halogens as common contributing factors to equipment corrosion. These may be used singly or in a combination of two or more.

Other additives such as an antioxidant, an ultraviolet absorber, a flame retardant, a fluorescent brightening agent, a matting agent, a plasticizer, and an antifoam agent may also be added to the polyester used as necessary.

To obtain a polyalkylene terephthalate with an even higher molecular weight, the polyalkylene terephthalate obtained through the method described above may be subjected to solid-state polymerization. The solid-state polymerization is performed through heat treatment in an atmosphere of an inert gas such as nitrogen or under reduced pressure, but there are no specific restrictions on the equipment or method.

The polyester may be produced through batch polymerization, semicontinuous polymerization, or continuous polymerization. As with the ordinary polyester, drying, spinning, drawing, and various other types of after-processing commonly performed in this field may be subjected to the obtained polyester.

The base body for an artificial leather can be obtained, for example, by a combination of the following steps:

step (a): preparing an ultrafine fiber-generating fiber (a conjugated fiber) mainly comprising a polyester having an average fiber diameter of 0.01 to 10 μm by melt-spinning to produce a conjugated fiber web, step (b): producing an intertwined fiber body by subjecting the conjugated fiber web to an intertwining treatment, step (c): removing a readily soluble polymer constituting the conjugated fiber from the conjugated fiber by dissolution, or by physical or chemical peeling or splitting for ultrafine fiber generation; and before and/or after the ultrafine fiber generation, applying an elastic polymer comprising polyurethane as its main component to a nonwoven fabric (the intertwined fiber body) and substantially coagulating the elastic polymer for solidification, and step (d): conducting napping treatment to form a nap on the surface.

Moreover, the step in which the readily soluble polymer is removed by dissolution, or by physical or chemical peeling or splitting in step (c) may be performed after the step (a), the step (b), the step in which an elastic polymer comprising polyurethane as its main component is applied to a nonwoven fabric (the intertwined fiber body) and the elastic polymer is substantially coagulated for solidification, and the step (d) in which napping treatment is conducted to form a nap on the surface.

The nonwoven fabric composed of intertwined ultrafine fiber tows is obtained preferably by using an ultrafine fiber-generating fiber such as an islands-in-the-sea fiber. Although it is difficult to directly produce a nonwoven fabric from an ultrafine fiber, taking the steps of producing a nonwoven fabric from an ultrafine fiber-generating fiber and of producing an ultrafine fiber from the ultrafine fiber-generating fiber of the above nonwoven fabric allows the production of a nonwoven fabric composed of intertwined ultrafine fiber tows.

The ultrafine fiber-generating fiber may be an islands-in-the-sea fiber prepared by using two types of thermoplastic resins having different solubilities, one of which is for the sea component and the other is for the island component, and removing the sea component by using the solvent or the like to thereby obtain an ultrafine fiber comprising the island component, or a splittable conjugated fiber prepared by alternately arranging two types of thermoplastic resins radially or in the form of a laminate in the fiber cross-section, and segmenting the fiber by peeling and splitting each component to thereby form ultrafine fibers.

Examples of the islands-in-the-sea fibers include an islands-in-the-sea conjugated fiber prepared by using a spinneret for islands-in-the-sea conjugation, namely, by mutually aligning two components, the sea component and the island component, and spinning the aligned sea and island components from the spinneret; and a mix-spun fiber prepared by spinning a mixture of two components, the sea component and the island component. The islands-in-the-sea conjugated fiber is particularly preferably used because ultrafine fibers produced from islands-in-the-sea conjugated fibers have uniform fineness and have sufficient length contributing for the strength of a sheet-like material (intertwined fiber body) to be produced.

The sea component of the islands-in-the-sea fiber may be a copolymerized polyester obtained by copolymerizing with polyethylene, polypropylene, polystyrene, sodium sulfoisophthalate, and polyethylene glycol, and a polylactic acid. Among them, a polyester obtained by copolymerizing with 5-sodium sulfoisophthalate is preferably used.

Removal by dissolution of the sea component may be conducted either before or after the application of the elastic polymer, or after the napping treatment.

As described above, examples of the method which may be used in producing a nonwoven fabric include the method in which the fiber webs are intertwined by needle punching or water jet punching; spun bonding, melt blowing, and paper making method, and among them, preferred are the methods using needle punching or water jet punching to carry out the example using ultrafine fiber tows as described above.

The nonwoven fabric may be integrated with a woven or knitted fabric by laminating the nonwoven fabric and the woven or knitted fabric, and preferred is the method in which the integration is accomplished by needle punching or water jet punching.

In needle punching, the needle may preferably have 1 to 9 needle barbs. The fibers can be efficiently intertwined by using a needle having at least 1 needle barb, while damages done to the fibers can be suppressed by limiting the number of barbs to up to 9 needle barbs. The number of the ultrafine fiber-generating fibers caught by the barb depends on the shape of the barb and the diameter of the ultrafine fiber-generating fiber. The barb of the needle used in the needle punching step is preferably the one shaped to have a kick-up of 0 to 50 μm, an undercut angle of 0 to 40°, a throat depth of 40 to 80 μm, and a throat length of 0.5 to 1.0 mm so that 3 to 10 ultrafine fiber-generating fibers can be caught.

The number of punchings is preferably 1000 to 7500 punchings/cm$^2$. When the number of punchings is at least 1000 punchings/cm$^2$, higher density as well as higher precision finishing will be achieved. In contrast, loss of processability, fiber damages, and decrease in the strength will be prevented by limiting the number of punchings to up to 7500 punchings/cm$^2$.

In addition, when a woven or knitted fabric and a nonwoven fabric comprising an ultrafine fiber-generating fiber are integrated by lamination, the direction of the barb of the needle used in the needle punching of the laminate is at an angle 90 (right angle)±20° in relation to the machine direction of the sheet, and this prevents hooking of the wefts which are susceptible to damage.

When water jet punching is conducted, the water is preferably in a columnar flow. More specifically, the water is preferably ejected from a nozzle having a diameter of 0.05 to 1.0 mm at a pressure of 1 to 60 MPa.

The apparent density of the nonwoven fabric comprising an ultrafine fiber-generating fiber after the needle punching or the water jet punching is preferably 0.15 to 0.30 g/cm$^3$. The base body for an artificial leather will have sufficient form and size stabilities when the apparent density is at least 0.15 g/cm$^3$, while a space sufficient for applying the elastic polymer will be retained when the apparent density is up to 0.30 g/cm$^3$.

Preferably, for dense texture, the thus obtained nonwoven fabric comprising an ultrafine fiber-generating fiber is shrunk by dry heating, wet heating, or both, and the density of the fabric is further increased by compression with a roll or the like in a thickness direction.

The solvent used to remove the readily soluble polymer (sea component) from the ultrafine fiber-generating fiber by dissolution may be an organic solvent such as toluene and trichloroethylene when the sea component is a polyolefin such as polyethylene and polystyrene, and it may be an alkaline aqueous solution such as sodium hydroxide when the sea component is a polylactic acid or a copolymerized polyester. The treatment for the ultrafine fiber generation (sea removal treatment) may be conducted by immersing the nonwoven fabric comprising the ultrafine fiber-generating fiber in a solvent, and wringing the solvent out of the nonwoven fabric.

The treatment for the ultrafine fiber generation may be conducted by known apparatus such as a continuous dyeing machine, a Vibro washer type sea removing machine, a jet dyeing machine, a wince dyeing machine, or a jigger dyeing machine. The treatment for the ultrafine fiber generation may be conducted either before or after the napping treatment.

Application of the elastic polymer to the intertwined fiber body (e.g. nonwoven fabric) may be conducted either before or after the treatment for the ultrafine fiber generation.

Preferable examples of the solvent in the case of applying polyurethane as the elastic polymer include N,N'-dimethylformamide and dimethyl sulfoxide. Polyurethane may also be applied in the form of an oil-in-water emulsion containing polyurethane dispersed in water.

The elastic polymer is applied to the intertwined fiber body (nonwoven fabric) by dipping the intertwined fiber body (nonwoven fabric) in a solution of the elastic polymer in a solvent, and subsequently dried to substantially coagulate and solidify. In the case of a polyurethane solution in a solvent, the coagulation can be promoted by dipping in a non-solvent, and in the case of a gellable aqueous dispersion type polyurethane liquid, the coagulation can be accomplished by a dry coagulation method in which a polyurethane liquid is dried after gelation. Drying can be conducted by heating at such a temperature not to adversely affect the performance of the intertwined fiber body and the elastic polymer.

The base body for an artificial leather may have at least one surface napped, and the napping treatment can be conducted by using a sandpaper or roll sander. In napping with a sandpaper, a nap formed will be consistent and dense. In addition, the use of a smaller load in grinding is preferable for the formation of a consistent nap on the surface of the base body for an artificial leather. The use of a smaller load in grinding can be accomplished, for example, by employing a multi-stage buffing using three or more buff stages, and in a preferred embodiment, a sandpaper in the range of No. 120 to No. 600 (according to JIS) is used in each stage.

The base body for an artificial leather may contain functional reagents such as a dye, a pigment, a softening agent, an anti-pilling agent, an antimicrobial agent, a deodorant, a water repellent, a lightproofing agent, and a weatherproofing agent.

The base body for an artificial leather can be dyed to produce a suede-like artificial leather. Dyeing is preferably conducted by using a jet dyeing machine because the use of a jet dyeing machine allows both sheet softening by rubbing and sheet dyeing. The temperature used in dyeing a polyester fiber is preferably 100 to 150° C., and the dye used is preferably an acid dye, a premetalized dye, a reactive dye, or the like. A reduction cleaning may be conducted after the dyeing.

In addition, a dyeing aid is preferably used for the purpose of improving dyeing consistency and finishing may be conducted by using a softening agent such as silicones, an antistatic agent, a water repellent, a flame retardant, and a lightproofing agent. The finishing may be conducted either after the dyeing or simultaneously with the dyeing.

The base body for an artificial leather not only uses an environment-conscious material, but also has excellent thermostability. Accordingly, the base body is well adapted for use in textile applications, sundry applications, and industrial material applications such as CD/DVD curtains, base material for polishing pad, various types of abrasive cloth, and wiping cloth.

EXAMPLES

Next, our base bodies and methods are described in concrete terms below based on experimental examples and working examples. However, this disclosure is not limited to these examples and various variations or modifications may be made thereto without departing from the technical scope of the appended claims.

Raw Materials Used in Polymerization

Biomass-derived ethylene glycol: manufactured by Changchun Dacheng Industrial Group Co., Ltd. (ethylene glycol=98.138% by weight, 1,2-propanediol=5410 ppm, 1,2-butanediol=2390 ppm, 2,3-butanediol=6310 ppm, 1,4-butanediol=4510 ppm)

Fossil resource-based ethylene glycol: manufactured by Mitsubishi Chemical Corporation (ethylene glycol=99.989% by weight, 1,2-propanediol<15 ppm (undetectable), diethylene glycol=110 ppm)

Terephthalic acid: high purity terephthalic acid manufactured by Mitsui Chemicals, Inc. (1,2-propanediol<15 ppm (undetectable))

Dimethyl terephthalate: manufactured by SK Chemicals (1,2-propanediol<15 ppm (undetectable))

Methods Used for Measurement and Processing for Evaluation (1) Intrinsic Viscosity (IV) of Polyester Intrinsic viscosity (IV) of polyester was measured at a temperature of 25° C. using ortho-chlorophenol as a solvent.

(2) Thermostability Index ($\Delta$IV)

Using a melt indexer (MX-101B) manufactured by Takara Industry Co., Ltd., 6.0 g of a sample (intrinsic viscosity: IVa), which had been vacuum-dried in advance at a temperature of 150° C. and a pressure of 133 Pa or less for 20 hours, was extruded under the following setting conditions:

Load: 1000 g
Orifice inside diameter: 2.092 mm$\phi$
Measurement distance: 25.4 mm
Cylinder temperature×Retention time: 295° C.×60 minutes After the polymer was retained at a temperature of 295° C. for 60 minutes as mentioned above, extrusion was started. The melt polymer extruded from the start to the end of measurement was recovered and chipped. The chips were mixed together. The intrinsic viscosity (IVb) of the mixture was measured, and from the measured intrinsic viscosity, the thermostability index (ΔIV) as an indicator for the reduction in intrinsic viscosity during melting was calculated in accordance with the following formula:

$$\Delta IV = (IVa) - (IVb)$$

(3) Melting Point

The measurement was conducted using DSC-7 manufactured by Perkin Elmer, and the peak top temperature, indicating the melting of the polymer, in the 2nd run was used as the melting point of the polymer. The temperature was elevated at a rate of 16° C./minute, and the amount of a sample was 10 mg. The measurement was conducted twice, and the average was used as the melting point.

(4) Melt Flow Rate (MFR)

In the cylinder of the electric furnace of the MFR meter, 4 to 5 g of a sample pellet was placed, and using Melt Indexer (S101) manufactured by Toyo Seiki Co, Ltd., extrusion was conducted under the conditions of the load of 2160 gf and the temperature of 285° C., and the amount (g) of the resin extruded for 10 minutes was measured. The measurement described above was repeated 3 times, and the average was used as the MFR.

(5) Amount of Diethylene Glycol (DEG) Contained in Polymer

After adding 1,6-hexanediol as an internal standard substance, the polymer was decomposed at a temperature of 260° C. using 2-aminoethanol as a solvent. After cooling, methanol was added, neutralization with an acid was conducted, and the resulting precipitates were filtered out. The filtrate was then subjected to a measurement using a gas chromatograph (GC-14B) manufactured by Shimadzu Corporation.

(6) Amount of 1,2-Propanediol-Derived Component Contained in Polymer

First, a 1490 μg/ml aqueous 1,2-butanediol solution was prepared for use as an internal standard solution A. Next, 0.1 g of a sample was weighed and placed in a vial, and 0.015 ml of the internal standard solution A and 1 ml of aqueous ammonia were added. After sealing with a stopper, the vial was heated for 3 hours at a temperature of 150° C. and then left to stand to cool down to room temperature. After this, 2 ml of methanol and 2.0 g of terephthalic acid were added, followed by 15 minutes of shaking and 3 minutes of centrifugal separation at 4000 G. The supernatant liquid was taken out and subjected to a measurement using a gas chromatograph (5890 series II, injector: split/splitless, detector: hydrogen flame ionization detector) manufactured by Hewlett Packard under the setting conditions specified below, and the content of the 1,2-propanediol-derived component was determined using a calibration curve to be described later.

Injector temperature: 220° C.
Column head pressure: 20 psi
Carrier gas: helium
Sample injection method: split (linear flow rate: 25 ml/minute)
Septum purge: helium 3.0 ml/minute
Amount of sample introduced: 1.0 μl
Detector temperature: 220° C.
Gas flow rate: hydrogen 40 ml/minute, air 400 ml/minute, and nitrogen 40 ml/minute
Oven heating starting temperature: 60° C. (retention time: 2 minutes)
Oven heating stopping temperature: 220° C. (retention time: 30 seconds)
Oven heating rate: 20° C./minute (slope of straight line graph)

The calibration curve for 1,2-propanediol was prepared in the following procedure. A 2500 μg/ml aqueous 1,2-propanediol solution was prepared for use as a standard mother liquid B. Then, 0.003 to 0.08 ml of the standard mother liquid B and 0.025 ml of the internal standard solution A were placed in a 5-ml measuring flask, diluted with a mixed solvent (methanol: purified water=2:1, containing 1.1% of ethylene glycol), and made to a constant volume to prepare seven types of standard solutions C containing different amounts of the standard mother liquid B. Each of the standard solutions C was subjected to a measurement using a gas chromatograph under the conditions specified above, and a calibration curve for 1,2-propanediol was produced by plotting the peak area ratios between the obtained 1,2-propanediol and the internal standard substance and the concentration ratios between the 1,2-propanediol and the internal standard substance contained in the standard solutions C.

(7) Amount of 1,2-Propanediol Contained in Ethylene Glycol

About 0.15 g of ethylene glycol was weighed, dissolved with acetone in a 5-ml measuring flask, and made to a constant volume. The prepared solution was subjected to a measurement using a gas chromatograph (5890 series II, injector: split/splitless, detector: hydrogen flame ionization detector) manufactured by Hewlett Packard under the setting conditions specified below, and the 1,2-propanediol content was determined using a calibration curve obtained from the same measurement procedure performed on 1,2-propanediol in place of the sample.

Injector temperature: 250° C.
Column head pressure: 15 psi
Carrier gas: helium
Sample injection method: split (linear flow rate: 50 ml/minute)
Septum purge: helium 3.0 ml/minute
Amount of sample introduced: 1.0 μl
Detector temperature: 250° C.
Gas flow rate: hydrogen 40 ml/minute, air 400 ml/minute, and nitrogen 40 ml/minute
Oven heating starting temperature: 50° C. (retention time: 3 minutes)
Oven heating stopping temperature: 250° C. (retention time: 1 minute)
Oven heating rate: 15° C./minute (slope of straight line graph)

(8) Accumulation of Deposits on Spinneret Area and Frequency of Broken Thread

Using a long-focus microscope, the spinneret area was observed 100 hours after the start of the spinning of fiber for any accumulation of deposits. The condition of the spinneret area was assessed according to the following grades: Few deposits observed, no broken thread incidents occurring, and production possible to be conducted (pass/good); Deposits observed and broken thread incidents caused thereby occurring frequently (failure).

(9) Biobased Content Measurement Method

The biobased content of polyester was determined in accordance with ASTM D6866.

Specifically, after pulverizing a sample (ultrafine fiber) with sandpaper and a grinder, the pulverized sample was heated with copper oxide and completely oxidized to carbon dioxide, followed by reduction to graphite using iron powder and conversion into a single compound of carbon. The obtained graphite sample was introduced into an AMS system and the $^{14}C$ concentration was measured. At the same time, the $^{14}C$ concentration of oxalic acid, a standard substance (supplied by National Institute of Standards and Technology, NIST), was measured. Next, $\Delta^{14}C$ was calculated in accordance with the following formula:

$$\Delta^{14}C=\{(^{14}As-^{14}Ar)/^{14}Ar\}\times1000$$

Where $^{14}As$ is the ratio between $^{14}C$ and $^{12}C$ ($^{14}C/^{12}C$) of the sample, and
$^{14}Ar$ is the ratio between $^{14}C$ and $^{12}C$ ($^{14}C/^{12}C$) of the standard substance.

Based on this $\Delta^{14}C$ value, pMC (percent Modern Carbon) was then calculated in accordance with the following formula:

$$pMC=\Delta^{14}C/10+100$$

Finally, the biobased content was calculated by multiplying the pMC value by 0.95 (=100/105) in accordance with ASTM (American Society for Testing and Materials) D6866 as follows:

Biobased content (%)=0.95×pMC

(10) Average Fiber Diameter of Ultrafine Fiber

A base body for an artificial leather comprising an ultrafine fiber was sectioned in the direction normal to the thickness, the cross section was observed by a scanning electron microscope (SEM) (VE-7800) manufactured by KEYENCE at a magnification of 3000, and the diameters of 50 single fibers randomly chosen from a view of 30 μm×30 μm were measured. This measurement was conducted at three locations to measure the diameters of 150 single fibers in total, the average was calculated, and the resulting value was rounded off to nearest integer. When the ultrafine fiber had an irregular cross-section, the cross-sectional area of the single fiber was first measured and then the diameter was calculated when the cross-section was deemed a true circle. The resulting value was determined as a single fiber diameter.

(11) Product Abrasion Evaluation (Martin Dale Abrasion Evaluation)

An abrasion test was conducted using Model 406 manufactured by James H. Heal & Co. as a Martin dale abrasion and pilling tester and ABRASIVE CLOTH SM25 manufactured by James H. Heal & Co. as a standard abrasive cloth, and a load equivalent to 12 kPa was applied on a sample (artificial leather). The appearance of the sample after 20000 times of abrasion was visually observed and evaluated. The sample in which no change in appearance after the abrasion was found was evaluated as "level 5", the one in which a large number of pills were formed was evaluated as "level 1", and the levels in between were set with an increment of 0.5.

Reference Example 1

Twenty kilograms of biomass-derived ethylene glycol was prepared and subjected to a distillation operation performed under a set of conditions comprising 40 theoretical plates, a pressure of 50 mmHg, and a reflux ratio of 10, and crude ethylene glycol (containing 3520 ppm of 1,2-propanediol) was obtained as a bottom residue. The obtained crude ethylene glycol was heated for 15 hours in a heating pot set to a temperature of 190° C., followed by cooling down to room temperature.

Meanwhile, activated carbon (Taiko SGA, manufactured by Futamura Chemical Industries Co., Ltd.) was washed with soft water and dried, and then packed in an activated carbon treatment system. The activated carbon layer was 300 cm thick and the space velocity was 0.57 hr$^{-1}$. The biomass-derived ethylene glycol, which had been heated and cooled as described above, was passed through the activated carbon layer and recovered. In the end, biomass-derived ethylene glycol (purified product) containing 220 ppm of 1,2-propanediol was obtained.

Reference Example 2

In the same manner as Reference example 1, except that the thickness of the activated carbon layer and the space velocity were changed to 200 cm and 0.86 hr$^{-1}$, respectively, biomass-derived ethylene glycol (purified product) containing 910 ppm of 1,2-propanediol was obtained.

Reference Example 3

In the same manner as Reference example 1, except that the heating time of crude ethylene glycol after the distillation operation, the thickness of the activated carbon layer, and the space velocity were changed to 30 hours, 500 cm, and 0.34 hr$^{-1}$, respectively, biomass-derived ethylene glycol (purified product) containing 50 ppm of 1,2-propanediol was obtained.

Reference Example 4

Biomass-derived ethylene glycol was heated for 10 hours in a heating pot set to a temperature of 190° C., followed by cooling down to room temperature.

Meanwhile, activated carbon was washed with soft water and dried, and then packed in an activated carbon treatment system. The activated carbon layer was 150 cm thick, and the space velocity was 1.14 hr$^{-1}$. The biomass-derived ethylene glycol, which had been heated and cooled as described above, was passed through the activated carbon layer and recovered. In the end, biomass-derived ethylene glycol (crude product) containing 2790 ppm of 1,2-propanediol was obtained.

Reference Example 5

Twenty kilograms of biomass-derived ethylene glycol was prepared and subjected to a first distillation operation performed under a set of conditions comprising 30 theoretical plates, a pressure of 50 mmHg, and a reflux ratio of 5, and crude ethylene glycol (containing 4180 ppm of 1,2-propanediol) was obtained as a bottom residue. The obtained crude ethylene glycol was then subjected to a second distillation operation performed under a set of conditions comprising 30 theoretical plates, a pressure of 50 mmHg, and a reflux ratio of 5. In the end, biomass-derived ethylene glycol (crude product) containing 3020 ppm of 1,2-propanediol was obtained as a bottom residue.

Reference Example 6

Fossil resource-based ethylene glycol with an undetectable 1,2-propanediol content (less than 15 ppm) (manufactured by Mitsubishi Chemical Corporation) was used.

Working Example 1

Throughout this working example, the biomass-derived ethylene glycol (purified product) obtained in Reference example 1 was used.

Over 4 hours, a slurry of 82.5 kg of terephthalic acid and 35.4 kg of ethylene glycol was gradually fed to an esterification reaction tank in which approx. 100 kg of bis(hydroxyethyl)terephthalate, produced using dimethyl terephthalate and ethylene glycol, had been placed and which had been kept at a temperature of 250° C. at a pressure of 1.2×100,000 Pa. After the feeding was completed, the esterification reaction was allowed to continue for 1 hour, and the resulting 101.5-kg esterification reaction product was transferred to a condensation polymerization tank.

After the transfer, a quantity of antimony trioxide equivalent to 240 ppm on an antimony atom basis and a quantity of trimethyl phosphate equivalent to 18 ppm on a phosphorus atom basis—both with respect to the polymer to be obtained—were dissolved in ethylene glycol and the solution was added to the esterification reaction product. Five minutes later, a quantity of an ethylene glycol slurry of titanium oxide particles equivalent to 0.1% by weight on a titanium oxide particle basis with respect to the polymer to be obtained was also added. After this, the pressure was reduced with stirring at a speed of 30 rpm to start the reaction. As the interior temperature of the reaction vessel was gradually increased from 250 to 280° C., the pressure was reduced to 110 Pa. The time to reach the predetermined final temperature and pressure was set to 60 minutes. As soon as the predetermined stirring torque was reached, the reaction system was returned to normal pressure via a nitrogen purge to stop the condensation polymerization reaction, and the polymer was discharged in a strand form and cooled, and this was immediately followed by cutting to obtain polymer pellets. The obtained polymer characteristics are summarized in Table 1.

Working Example 2

Throughout this working example, the biomass-derived ethylene glycol (purified product) obtained in Reference example 1 was used.

A quantity of magnesium acetate equivalent to 60 ppm on a magnesium atom basis with respect to the polymer to be obtained, 100 kg of dimethyl terephthalate, and 58 kg of ethylene glycol were melted at a temperature of 150° C. in a nitrogen atmosphere and then heated to a temperature of 230° C. over 3 hours while being stirred, which allowed removal of methanol by distillation and progress of an ester interchange reaction to give bis(hydroxyethyl)terephthalate. The obtained bis(hydroxyethyl)terephthalate was transferred to a condensation polymerization tank.

After the transfer, a quantity of antimony trioxide equivalent to 250 ppm on an antimony atom basis and a quantity of trimethyl phosphate equivalent to 40 ppm on a phosphorus atom basis—both with respect to the polymer to be obtained—were mixed in a mixing tank 30 minutes before their introduction to the condensation polymerization tank. After being stirred for 30 minutes at room temperature, the mixture was added to the bis(hydroxyethyl)terephthalate in the condensation polymerization tank. Five minutes later, a quantity of an ethylene glycol slurry of titanium oxide particles equivalent to 0.1% by weight on a titanium oxide particle basis with respect to the polymer to be obtained was also added. Another five minutes later, the pressure of the reaction system was reduced to start the reaction. As the interior temperature of the reaction vessel was gradually increased from 250 to 280° C., the pressure was reduced to 110 Pa. The time to reach the predetermined final temperature and pressure was set to 60 minutes. As soon as the predetermined stirring torque was reached, the reaction system was returned to normal pressure via a nitrogen purge to stop the condensation polymerization reaction, and the polymer was discharged in a strand form and cooled, and this was immediately followed by cutting to obtain polymer pellets. It took 3 hours and 30 minutes from the start of pressure reduction to the reaching of the predetermined stirring torque. The obtained polymer characteristics are summarized in Table 1.

Working Examples 3 and 4

Polymer pellets were obtained in the same manner as Working example 1, except that the ethylene glycol used was as specified in Table 1. The results are summarized in Table 1.

Working Example 5

Polymer pellets were obtained in the same manner as Working example 2, except that the type and amount of the polymerization catalyst added and the amount of the titanium oxide added were changed; and that a quantity of sodium 5-sulfoisophthalate dimethyl ester equivalent to 8 mol % with reference to the total dicarboxylic acid component constituting the polymer to be obtained was added to the esterification reactant. The results are summarized in Table 1.

Working Example 6

Polymer pellets were obtained in the same manner as Working example 1, except that a quantity of sodium 5-sulfoisophthalate dimethyl ester equivalent to 5 mol % with reference to the total dicarboxylic acid component constituting the polymer to be obtained was added to the esterification reactant. The results are summarized in Table 1.

Working Example 7

<Staple Fiber>
(Polymer of Island Component)
The polyester pellets produced in Working example 1 were used for the polymer of the island component.
(Polymer of Sea Component)
A polystyrene (PSt) having a Vicat softening point of 102° C. and a MFR of 67.8 was used for the polymer of the sea component.
(Fiber Polymer Constituting Woven or Knitted Fabric)
A polyethylene terephthalate (PET) having a melting point of 260° C. and a MFR of 98.5 was used for the fiber polymer constituting woven or knitted fabric.
(Spinning and Stretching)
Using the polymers of the island component, the melt spinning was conducted under the conditions including a spinning temperature of 285° C., an island/sea mass ratio of 80/20, an ejection rate of 1.4 g/minute per hole, and a spinning speed of 1200 m/minute with a 16 islands/hole islands-in-the-sea type conjugated spinneret.

Next, the extrudate was stretched in two stages in a liquid bath at a temperature of 85° C. to a total stretch ratio of 2.8, and crimped in a stuffing box crimper. The resulting islands-in-the-sea conjugated fiber had a single fiber fineness of 4.2 dtex. This islands-in-the-sea conjugated fiber was cut at a fiber length of 51 mm to obtain a staple fiber composed of an islands-in-the-sea conjugated fiber.
<Intertwined Body (Sheet Base Body) Comprising Nonwoven Fabric and Woven Fabric>
A laminated fiber web was formed by subjecting the above staple fiber made of an islands-in-the-sea conjugated fiber to curding and cross lapping steps, and 17 sheets were laminated. Next, the laminated fiber web obtained above was sandwiched by sheets of woven fabric comprising the above PET as a fiber constituting woven or knitted fabric.

The woven fabric used had a plain weave texture and a surface density of 80×66 (warps×wefts) per inch, the twist yarns for the warps and wefts had a single fiber diameter of 140 µm (total fineness: 110 dtex, 288 filaments), and the twist number was 2000 T/m. Then, the resulting laminate, in which the woven fabric, the laminated fiber web, and the woven fabric were layered in an order from the top, was subjected to needle punching at a needle depth of 7 mm and a needle density of 3000 needles/cm$^2$ using a needle puncher having one needle having a total barb depth of 0.075 mm to produce a sheet base body obtained by integration through lamination and intertwinement of the woven fabric and the nonwoven fabric comprising the islands-in-the-sea conjugated fiber, having a weight per unit area of 710 g/m$^2$ and an apparent density of 0.245 g/cm$^3$.

<Base Body for Artificial Leather>

The above sheet base body was shrunk by exposing to hot water at a temperature of 98° C., immersed in a 5% aqueous PVA (polyvinyl alcohol) solution, and dried for 10 minutes by hot air at a drying temperature of 120° C., to obtain a sheet base body in which the mass of PVA is 6% by mass in relation to that of the sheet base body. The sheet base body was immersed in trichloroethylene to remove the sea component by dissolution, and a sheet with the sea component removed in which the nonwoven fabric comprising the ultrafine fiber and the woven fabric were integrated by intertwinement was obtained. The thus obtained sheet with the sea component removed was immersed in a DMF (dimethylformamide) solution of a polycarbonate-type polyurethane with a solid concentration adjusted to 12%, and then the polyurethane was coagulated in a 30% aqueous DMF solution. PVA and DMF were removed with hot water and the sheet was dried for 10 minutes by hot air at a drying temperature of 110° C. to prepare an artificial leather in which the amount of the polyurethane was 27% by mass in relation to the total mass of the ultrafine fiber comprising the island component and the woven fabric. The sheet was then cut in half in a thickness direction with a slicer having an endless band knife, the sliced surface was buffed in three stages using a HS #180 sandpaper to form a nap, and thereby a base body for an artificial leather was prepared. The fiber diameter of the ultrafine fiber was 4.4 µm.

<Artificial Leather>

Furthermore, the above base body for an artificial leather was dyed with a disperse dye using a circular drier to prepare an artificial leather (artificial leather product). The obtained artificial leather had a good quality with a high density. The product abrasion level was 4.5, which was evaluated as favorable. The results are shown in Table 2.

Working Example 8

An artificial leather was produced in the same manner as Working example 7, except for the use of the polyester pellets produced in Working example 2 as the polymer of the island component. The results are shown in Table 2.

Working Example 9

An artificial leather was produced in the same manner as Working example 7, except for the use of the polyester pellets produced in Working example 3 as the polymer of the island component. The results are shown in Table 2.

Working Example 10

An artificial leather was produced in the same manner as Working example 7, except for the use of the polyester pellets produced in Working example 4 as the polymer of the island component. The results are shown in Table 2.

Working Example 11

<Staple Fiber>
(Polymer of Island Component)
The polyester pellets produced in Working example 1 were used for the polymer of the island component.
(Polymer of Sea Component)
The polyester pellets produced in Working example 5 were used for the polymer of the sea component.
(Fiber Polymer Constituting Woven or Knitted Fabric)
The polyester pellets produced in Working example 1 were used for the fiber polymer constituting woven or knitted fabric.
<Staple Fiber>
A staple fiber composed of an islands-in-the-sea conjugated fiber was obtained in the same manner as Working example 1, except for the use of the above polyester pellets as the polymer of the sea component. The obtained stable fiber had a single fiber fineness of 4.2 dtex and a fiber length of 51 mm.
<Intertwined Body (Sheet Base Body) Comprising Nonwoven Fabric and Woven Fabric>
A sheet base body was obtained in the same manner as Working example 1, except for the use of the above staple fiber composed of an islands-in-the-sea conjugated fiber.
<Aqueous Dispersion Type Polyurethane Liquid>
An aqueous dispersion type polyurethane liquid was prepared by adding sodium sulfate as a heat sensitive gelation agent to a nonionic compulsorily emulsified type polyurethane emulsion (polycarbonate type) in an amount of 3% by mass in relation to the polyurethane solid content so that the concentration of the polyurethane liquid would be 10% by mass.
<Base Body for Artificial Leather>
The above sheet base body was shrunk for 3 minutes by exposing to hot water at a temperature of 98° C., and dried for 5 minutes at a temperature of 100° C. The above aqueous dispersion type polyurethane liquid was applied to the obtained sheet base body, and the sheet base body was dried for 5 minutes by hot air at a drying temperature of 125° C. to obtain a polyurethane-coated sheet base body having a polyurethane coating weight of 34% by mass in relation to the island component of the sheet base body.

The polyurethane-coated sheet base body was immersed in a 20 g/l aqueous sodium hydroxide solution which had been heated to a temperature of 90° C., and the treatment was continued for 30 minutes to remove the sea component from the islands-in-the-sea conjugated fiber by dissolution. The sheet base body was then cut in half in a thickness direction with a slicer having an endless band knife, the sliced surface was buffed in three stages using a JIS #150 sandpaper to form a nap, and thereby a base body for an artificial leather was prepared. The fiber diameter of the ultrafine fiber was 4.4 µm.
<Artificial Leather>
The above base body for an artificial leather was dyed with a disperse dye using a circular drier in the same manner as Working example 1, to prepare an artificial leather. The obtained artificial leather (artificial leather product) had a good quality with a high density. The product abrasion level was 4.0, which was evaluated as favorable. The results are shown in Table 1.

Working Example 12

An artificial leather was produced in the same manner as Working example 7, except for the use of the polyester pellets produced in Working example 6 as the polymer of the island component. The results are shown in Table 2.

Comparative Example 1

Polymer pellets were obtained in the same manner as Working example 1, except that the ethylene glycol used was as specified in Table 1. The results are summarized in Table 1.

Comparative Example 2

Polymer pellets were obtained in the same manner as Working example 5, except that the ethylene glycol used was as specified in Table 1. The results are summarized in Table 1.

Comparative Examples 3 and 4

Polymer pellets were obtained in the same manner as Working example 1, except that the ethylene glycol used was as specified in Table 1. The results are summarized in Table 1.

Comparative Example 5

An artificial leather was obtained in the same manner as Working example 7, except for the use of the polyester pellets produced in Comparative example 1 as the polymer of the island component. The results are shown in Table 2.

Comparative Example 6

An artificial leather was produced in the same manner as Working example 7, except for the use of the polyester pellets produced in Comparative example 3 as the polymer of the island component. The results are shown in Table 2.

Comparative Example 7

An artificial leather was produced in the same manner as Working example 7, except for the use of the polyester pellets produced in Comparative example 4 as the polymer of the island component. The results are shown in Table 2.

Comparative Example 8

An artificial leather was produced in the same manner as Working example 7, except for the use of the polyester pellets produced in Comparative example 1 as the polymer of the island component and the use of the polyester pellets produced in Comparative example 2 as the polymer of the sea component. The results are shown in Table 2.

TABLE 1

| | EG Type | Dicarboxylic acid component Type | Copolymerization component Type | Content [mol %] | Catalyst Polymerization catalyst | Amount [ppm] (equivalent, on atom basis) | Additives Phosphorus compound |
|---|---|---|---|---|---|---|---|
| Working example 1 | Reference example 1 | TPA | — | — | $Sb_2O_3$ | 240 | TMPA |
| Working example 2 | Reference example 1 | DMT | — | — | $Sb_2O_3$ | 250 | TMPA |
| Working example 3 | Reference example 2 | TPA | — | — | $Sb_2O_3$ | 240 | TMPA |
| Working example 4 | Reference example 3 | TPA | — | — | $Sb_2O_3$ | 240 | TMPA |
| Working example 5 | Reference example 1 | DMT | SSIA | 8 | Mannitol Ti | 5 | TMPA |
| Working example 6 | Reference example 1 | TPA | SSIA | 5 | $Sb_2O_3$ | 240 | TMPA |
| Comparative example 1 | Reference example 4 | TPA | — | — | $Sb_2O_3$ | 240 | TMPA |
| Comparative example 2 | Reference example 4 | DMT | SSIA | 8 | Mannitol Ti | 5 | TMPA |
| Comparative example 3 | Reference example 5 | TPA | — | — | $Sb_2O_3$ | 240 | TMPA |
| Comparative example 4 | Reference example 6 | TPA | — | — | $Sb_2O_3$ | 240 | TMPA |

| | Additives | | Polymer characteristics | | | | |
|---|---|---|---|---|---|---|---|
| | Amount [ppm] (equivalent, on atom basis) | Amount of $TiO_2$ [% by weight] | Intrinsic viscosity IV | ΔIV | DEG content [% by weight] | Content of 1,2-PD-derived components [ppm] | Biobased content [%] |
| Working example 1 | 18 | 0.1 | 0.72 | 0.060 | 1.3 | 52 | 20 |
| Working example 2 | 40 | 0.1 | 0.71 | 0.059 | 1.5 | 51 | 20 |

TABLE 1-continued

| | | | | | | | |
|---|---|---|---|---|---|---|---|
| Working example 3 | | 18 | 0.1 | 0.72 | 0.060 | 1.3 | 204 | 20 |
| Working example 4 | | 18 | 0.1 | 0.72 | 0.058 | 1.2 | 16 | 20 |
| Working example 5 | | 40 | 0.0 | 0.65 | 0.063 | 1.7 | 49 | 20 |
| Working example 6 | | 18 | 0.1 | 0.72 | 0.060 | 1.3 | 52 | 20 |
| Comparative example 1 | | 18 | 0.1 | 0.71 | 0.130 | 1.7 | 628 | 20 |
| Comparative example 2 | | 40 | 0.0 | 0.65 | 0.128 | 1.9 | 609 | 20 |
| Comparative example 3 | | 18 | 0.1 | 0.71 | 0.130 | 1.8 | 690 | 20 |
| Comparative example 4 | | 18 | 0.1 | 0.71 | 0.134 | 1.9 | Lower than minimum detection limit | 0 |

In Table 1, EG represents ethylene glycol, TPA represents terephthalic acid, DMT represents dimethyl terephthalate, SSIA represents sodium 5-sulfoisophthalate, DEG represents diethylene glycol, 1,2-PD represents 1,2-propanediol, and TMPA represents trimethyl phosphate.

TABLE 2

| | | Islands-in-the-sea conjugated fiber | | | | |
|---|---|---|---|---|---|---|
| | Island component | Sea component | Islands/Sea Mass ratio | Fineness of island component [dtex] | Accumulation of deposits on spinneret area Frequency of broken thread incident | Base body for artificial leather Product abrasion [level] |
| Working example 7 | Working example 1 | polystyrene | 80/20 | 0.21 | pass/good | 4.5 |
| Working example 8 | Working example 2 | polystyrene | 80/20 | 0.21 | pass/good | 4.5 |
| Working example 9 | Working example 3 | polystyrene | 80/20 | 0.21 | pass/good | 4.5 |
| Working example 10 | Working example 4 | polystyrene | 80/20 | 0.21 | pass/good | 4.5 |
| Working example 11 | Working example 1 | Working example 5 | 80/20 | 0.21 | pass/good | 4 |
| Working example 12 | Working example 1 | Working example 6 | 80/20 | 0.21 | pass/good | 4 |
| Comparative example 5 | Comparative example 1 | polystyrene | 80/20 | 0.21 | failure | 3.5 |
| Comparative example 6 | Comparative example 3 | polystyrene | 80/20 | 0.21 | failure | 3.5 |
| Comparative example 7 | Comparative example 4 | polystyrene | 80/20 | 0.21 | failure | 3.5 |
| Comparative example 8 | Comparative example 1 | Comparative example 2 | 80/20 | 0.21 | failure | 3 |

In Working examples 7 to 12, during the production process, hardly any accumulation of deposits was observed on the spinneret area, and no broken thread incidents occurred. However, in Comparative examples 5 to 8, during the production process, an accumulation of deposits was observed on the spinneret area, and broken thread incidents caused thereby frequently occurred.

INDUSTRIAL APPLICABILITY

The base body for an artificial leather which comprises biomass-derived glycol, is not only an environment-conscious material, but also excellent in thermostability and furthermore in abrasion resistance of polymers. Accordingly, the base body is well adapted for use in textile applications, sundry applications, and industrial material applications such as CD/DVD curtains, base material for polishing pad, various types of abrasive cloth, and wiping cloth.

The invention claimed is:

1. A base body for a napped artificial leather consisting of a nonwoven fabric prepared by intertwining an ultrafine fiber layer consisting of an ultrafine fiber having a 0.01 to 5 μm fiber diameter and 5 to 100% by mass of an elastic polymer impregnated into the nonwoven fabric, the ultrafine fiber comprising polyester as a constituent component, the polyester comprising a dicarboxylic acid and/or an ester-forming derivative thereof, and a diol as copolymerization components, the polyester containing 15 to 500 ppm of a 1,2-propanediol-derived component, wherein the ultrafine fiber is dispersed on a surface of the base body and one surface of the base body is subjected to a napping treatment, and wherein the napped artificial leather has a product abrasion level determined by a Martin Dale Abrasion Evaluation of four or more.

2. The base body for a napped artificial leather according to claim 1, wherein the 1,2-propanediol-derived component is present in an amount of 45 to 400 ppm in the polyester.

3. The base body for a napped artificial leather according to claim 1, wherein a 5-sulfoisophthalic acid salt and/or an ester-forming derivative thereof are contained as the copolymerization components.

4. The base body for napped artificial leather according to claim 2, wherein a 5-sulfoisophthalic acid salt and/or an ester-forming derivative thereof are contained as the copolymerization components.

5. The base body for a napped artificial leather according to claim 1, wherein the elastic polymer is polyurethane.

6. A napped artificial leather consisting of a base body consisting of a nonwoven fabric prepared by intertwining an ultrafine fiber layer consisting of an ultrafine fiber having a 0.01 to 5 µm fiber diameter and 5 to 100% by mass of an elastic polymer impregnated into the nonwoven fabric, the ultrafine fiber comprising polyester as a constituent component, the polyester comprising a dicarboxylic acid and/or an ester-forming derivative thereof, and a diol as copolymerization components, the polyester containing 15 to 500 ppm of a 1,2-propanediol-derived component, wherein the ultrafine fiber is dispersed on a surface of the base body and one surface of the base body is subjected to a napping treatment, and wherein the napped artificial leather has a product abrasion level determined by a Martin Dale Abrasion Evaluation of four or more.

* * * * *